United States Patent
Lin et al.

(10) Patent No.: US 9,485,622 B2
(45) Date of Patent: *Nov. 1, 2016

(54) WIRELESS POSITIONING AND WIRELESS POSITIONING METHOD AND APPARATUS

(71) Applicant: INTERNATIONAL BUSINESS MACHINES CORPORATION, Armonk, NY (US)

(72) Inventors: Yong Hua Lin, Beijing (CN); Qing Wang, Beijing (CN); Chao Xue, Beijing (CN); Xin Xiong, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,298

(22) Filed: Jun. 24, 2015

(65) Prior Publication Data

US 2015/0350830 A1    Dec. 3, 2015

Related U.S. Application Data

(63) Continuation of application No. 14/721,457, filed on May 26, 2015.

(30) Foreign Application Priority Data

May 29, 2014    (CN) .......................... 2014 1 0234432

(51) Int. Cl.

| | | |
|---|---|---|
| *H04W 4/02* | (2009.01) | |
| *H04W 12/08* | (2009.01) | |
| *H04W 84/12* | (2009.01) | |
| *G01S 5/02* | (2010.01) | |
| *G01S 5/00* | (2006.01) | |

(52) U.S. Cl.
CPC ............ *H04W 4/021* (2013.01); *G01S 5/0054* (2013.01); *G01S 5/0252* (2013.01); *H04W 84/12* (2013.01)

(58) Field of Classification Search
CPC ... H04W 4/021; H04W 84/12; H04W 48/04; H04W 4/02; H04W 4/025; G01S 5/12; G01S 5/14; G01S 5/00; G01S 5/0054
USPC ............ 455/456.1, 456.3, 456.2, 457, 404.2, 455/414.1, 440, 434; 370/338
See application file for complete search history.

(56) References Cited

U.S. PATENT DOCUMENTS

2015/0026637 A1*   1/2015   Ross ..................... G06F 3/0481
715/810

OTHER PUBLICATIONS

List of IBM Patents or Patent Applications Treated as Related; Date File: Jun. 24, 2015, pp. 1-2.
Yong Hua Lin, et al.,"Wireless Positioning and Wireless Positioning Method Adn Apparatus," U.S. Appl. No. 14/721,457, filed May 26, 2015.

* cited by examiner

*Primary Examiner* — Inder Mehra
(74) *Attorney, Agent, or Firm* — Cantor Colburn LLP; Keivan Razavi

(57) ABSTRACT

An apparatus for wireless positioning includes a first delimitation unit configured to delimit an initial boundary for a predetermined space to divide the predetermined space into at least two areas, each area of the at least two areas comprising multiple zones, the multiple zones including a boundary zone adjacent to the initial boundary; a detection unit configured to detect signal feature values of respective wireless access points in the boundary zone and determine an identifier set of the detected wireless access points; and a second delimitation unit configured to re-determine the boundaries of the at least two areas for the wireless positioning based on the detection results in the boundary zone. With the method and apparatus of embodiments of the present invention, it is possible to reduce the positioning calculation time while maintaining high positioning accuracy.

9 Claims, 6 Drawing Sheets

WIRELESS POSITIONING AND WIRELESS POSITIONING METHOD AND APPARATUS

DOMESTIC AND FOREIGN PRIORITY

This application is a continuation of U.S. patent application Ser. No. 14/721,457, filed May 26, 2015, which claims priority to Chinese Patent Application No. 201410234432.9, filed May 29, 2014, and all the benefits accruing therefrom under 35 U.S.C. §119, the contents of which in its entirety are herein incorporated by reference.

BACKGROUND

The present invention relates to a positioning technology, and more specifically, to a method and apparatus for performing the wireless positioning, and a wireless positioning method and apparatus.

The wireless Indoor Positioning System (IPS) based on WiFi plays a very important role in smart offices, smart city schemes and context-aware applications since the GPS signal is hard to cover indoor areas. Most wireless positioning approaches based on WiFi mainly comprise two phases: an offline training phase and an online localization phase. In the offline training phase, a map is built by collecting and training the received signal strength indicator (RSSI) data of access points (APs) at predetermined positions, and then in the online phase, the map is used to estimate positions.

At present, a common wireless positioning method based on WiFi uses a Reference Point (RP) to receive an environment WiFi signal and a signal from the mobile terminal for positioning judgment.

As the indoor range becomes larger and larger, both the offline process and the online process become very difficult. This is especially true in the online phase, because the amount of calculation required for positioning becomes exceptionally large, and usually results in positioning delay or even the system synchronization failure. A dynamic wireless positioning solution in which RPs need to be involved in both the offline training phase and the online localization phase has drawn more and more attention due to its high accuracy and time adaptation. Therefore, in building large scale wireless positioning systems, the selection of the number and position of RPs plays an important role for improving positioning accuracy, reducing computation load, and so on.

SUMMARY

Embodiments of the present invention adopt a layered method which divides the positioning process into two parts: an area positioning process and a zone positioning process, wherein each area consists of multiple zones. In the offline phase, the boundaries of the areas are delimited, and the number and the positions of PRs are selected from one area to another area until all the RPs are selected. In the online phase, the mobile terminal is firstly positioned to an area range, and then to a zone range.

According to one aspect of the present invention, there is provided an apparatus for wireless positioning, comprising: a first delimitation unit configured to delimit an initial boundary for a predetermined space to divide the predetermined space into at least two areas, each area of the at least two areas comprising multiple zones including a boundary zone adjacent to the initial boundary; a detection unit configured to detect a signal feature value of each wireless access point in the boundary zone and determine an identifier set of respective detected wireless access points; and a second delimitation unit configured to re-determine the boundaries of the at least two areas for the wireless positioning based on the detection result in the boundary zone.

According to another aspect of the present invention, there is provided an method for wireless positioning, comprising: delimiting an initial boundary for a predetermined space to divide the predetermined space into at least two areas, each area of the at least two areas comprising multiple zones, the multiple zones including a boundary zone adjacent to the initial boundary; detecting a signal feature value of each wireless access point in the boundary zone and determining an identifier set of respective detected wireless access points; and re-determining the boundaries of the at least two areas for the wireless positioning based on the detection result in the boundary zone.

According to yet another aspect of the present invention, there is provided a wireless positioning method comprising: receiving a positioning request from a mobile terminal; locating the mobile terminal into at least one zone in at least one area with its boundary re-determined based on the positioning request; and transmitting location information of the at least one zone to the mobile terminal.

According to yet another aspect of the present invention, there is provided a wireless positioning apparatus comprising: a receiving unit configured to receive a positioning request from a mobile terminal; a positioning unit configured to locate the mobile terminal into at least one zone in at least one area with its boundary re-determined based on the positioning request; and a transmitting unit configured to transmit location information of the at least one zone to the mobile terminal.

According to yet another aspect of the present invention, there is provided a computer program product for wireless positioning. The computer program product comprises a storage medium which may be accessed by a computer and store instructions which are executed by the computer to perform each operation of the method for wireless positioning provided by the above aspect of the present invention or each operation of the wireless positioning method provided by the above aspect of the present invention.

It is possible to reduce positioning calculation time while maintaining high positioning accuracy with the method, apparatus and computer program product according to embodiments of the present invention.

BRIEF DESCRIPTION OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION

Embodiments will be described in more detail with reference to the accompanying drawings, in which the embodiments of the present invention have been illustrated. However, embodiments the present invention may be implemented in various manners, and thus should not be construed to be limited to the embodiments disclosed herein. On the contrary, those embodiments are provided for the thorough and complete understanding of the present invention, and completely conveying the scope of the present invention to those skilled in the art.

Figure 1:
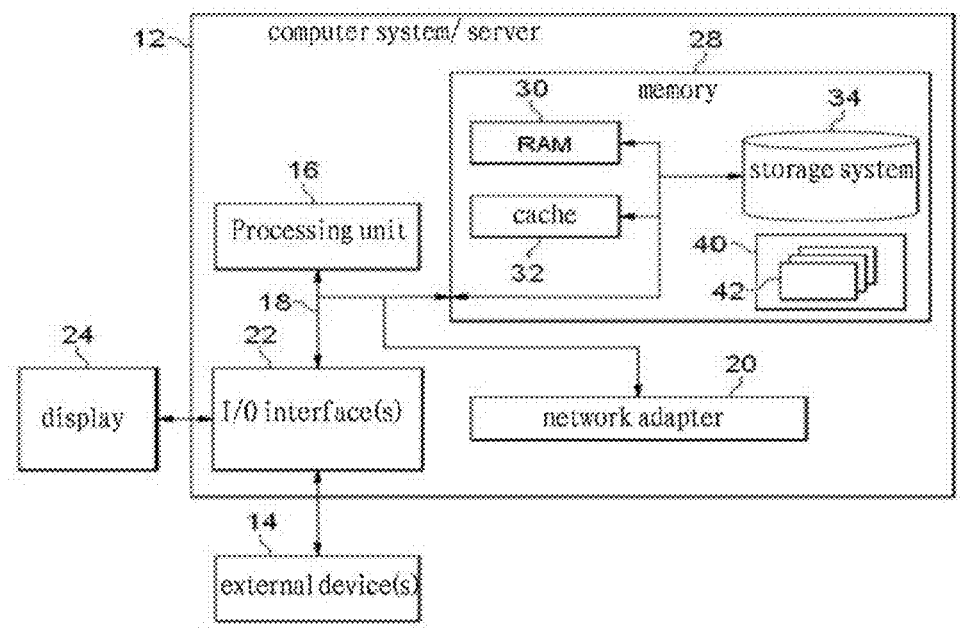
FIG. 1 shows an exemplary computer system/server which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
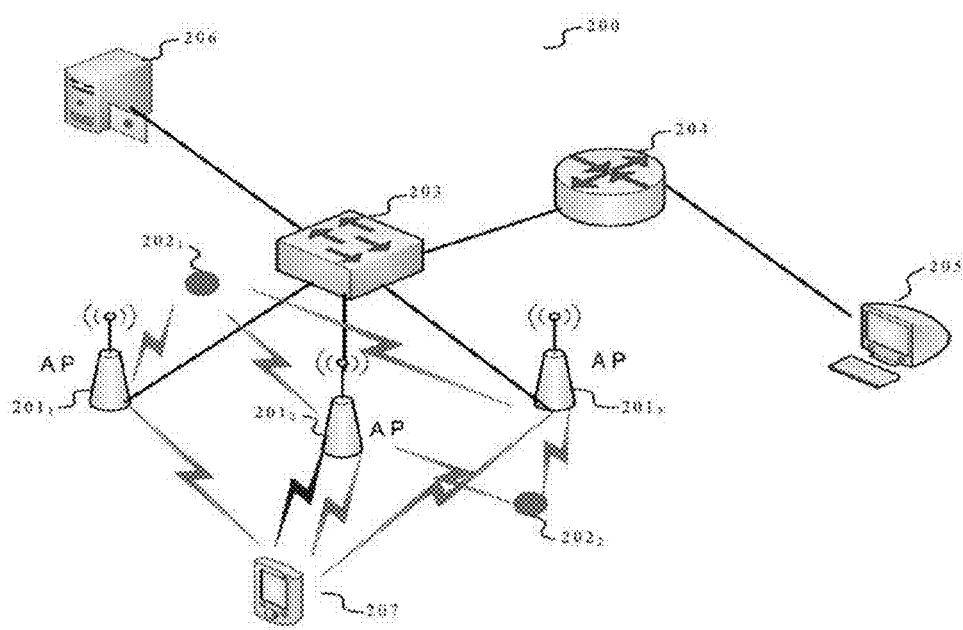
FIG. 2 shows a schematic diagram of the indoor positioning system according to an embodiment of the present invention.

FIG. 2 shows a schematic diagram of an indoor positioning system according to an embodiment of the present invention.

As shown in FIG. 2, the indoor positioning system 200 according to an embodiment of the present invention comprises multiple wireless access points (APs) $201_1$, $201_2$, $201_3$ (which are uniformly referred to as wireless access point 201 hereinafter unless a particular wireless access point is referred to) and multiple reference points $202_1$ and $202_2$ (which are uniformly referred to as reference point 202 hereinafter unless a particular reference point is referred to) distributed in a certain area range. Respective wireless access points (devices) and respective reference access points (devices) are coupled to a network device such as a switch 203, a router 204 or the like, and connected to a positioning server 205 and/or a outside internet (not shown) through those network devices. The positioning system 200 may also comprise an authentication server or the like.

On one hand, the wireless access point 201 is coupled to the positioning server 205 to exchange positioning information and other signals and instructions with it, and it may also be coupled to the outside internet to receive outside information from the internet and transmit information to the internet. On the other hand, the wireless access point 201 transmits wireless signals such as WiFi signals to a mobile terminal 207 within a certain area range. The wireless access point 201 also receives wireless signals from the mobile terminal 207.

The reference point 202 is configured to receive wireless signals from the wireless access point 201 and the mobile terminal 207. In addition, the reference point 202 may communicate with the positioning server and/or the mobile terminal.

According to an embodiment of the present invention, the mobile terminal 207 may be a smart phone, a personal digital assistant, a pad computer, a laptop computer, or the like.

The positioning server 205 is configured to receive a positioning request from the mobile terminal 207 through the wireless access point 201 and the reference point 202, and perform positioning operation of the mobile terminal 207 according to the wireless positioning method in accordance with an embodiment of the present invention.

Figure 3:
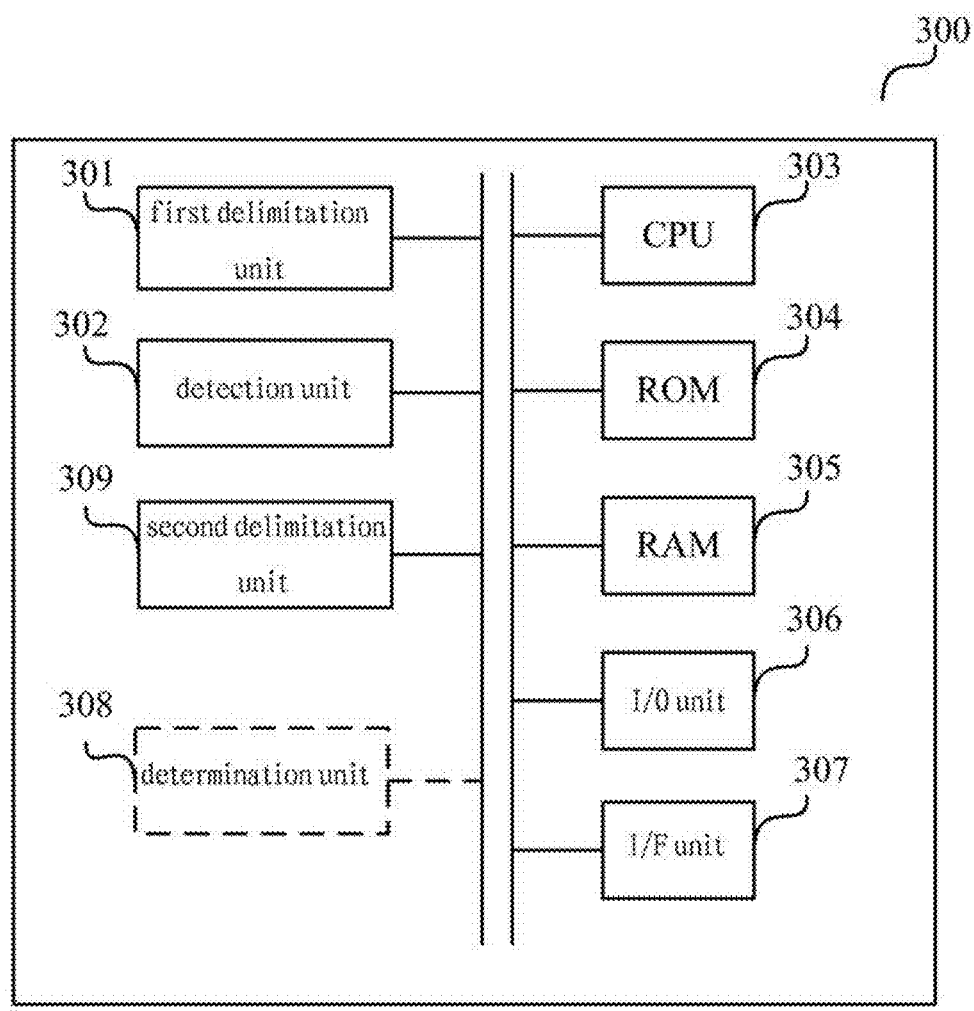
FIG. 3 shows a block diagram of an apparatus for wireless positioning according to an embodiment of the present invention.

FIG. 3 is a block diagram of an apparatus for performing the wireless positioning operation according to an embodiment of the present invention.

As shown in FIG. 3, the apparatus 300 for performing the wireless positioning operation according to an embodiment of the present invention may comprise a first delimitation unit 301, a detection unit 302 and a second delimitation unit 309. The first delimitation unit 301 may be configured to delimit an initial boundary for a predetermined space to divide the predetermined space into at least two areas, wherein each area of the at least two areas comprises multiple zones, and the multiple zones include a boundary zone adjacent to the initial boundary. The detection unit 302 may be configured to detect a signal feature value of each wireless access point in the zones adjacent to the initial boundary in said each area and determine an identifier set of detected wireless access points in the zones adjacent to the initial boundary. The second delimitation unit 309 may be configured to re-determine the boundaries of the at least two areas based on the signal feature values and the identifier set of the wireless access points detected in the zones adjacent to the initial boundary.

According to one embodiment of the present invention, the above signal feature value may be a received signal strength indicator (RSSI) from the wireless access point.

According to one embodiment of the present invention, the apparatus 300 may also comprise a central processing unit (CPU) 303 for executing related programs to process various data and control the operations of respective means (units) in the apparatus 300; a read-only memory 304 for storing various programs required by CPU 303 to perform various processing and controls; a random access memory (RAM) 305 for storing intermediate data temporarily generated by CPU 303 in the processing and control procedure; an input/output (I/O) means 306 for connecting to the outside devices to transmit various data between an outside device and the apparatus 300 according to an embodiment of the present invention; and a user interface (I/F) means 307 which comprises a keyboard, a mouse, a touch pad, and other means implemented by various display devices or sound devices that may interact with the user. These devices or means may be coupled to the first delimitation unit 301, the detection unit 302, the second delimitation unit 309 and so on in the apparatus 300 via a bus 308 to perform various control and related operations to realize various corresponding functions of the present invention.

According to one embodiment of the present invention, the functions of the first delimitation unit 301, the detection unit 302 and the second delimitation unit 309 may be realized by storing a program in the ROM 304 and executing the program in the CPU 303. According to one embodiment of the present invention, respective devices (units) in the apparatus 300 may be implemented by being combined to one unit. Their specific implementation does limit the scope of the present invention.

FIG. 4 is an illustrative diagram showing a method for wireless positioning according to an embodiment of the present invention.

Figure 4A:
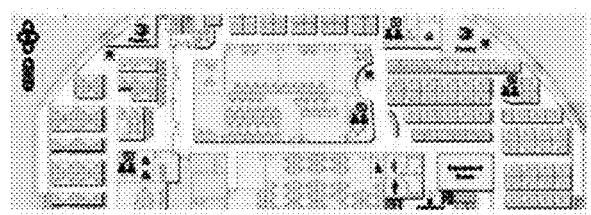
FIGS. 4(*a*), 4(*b*), 4(*c*), 4(*d*), 4(*e*), and 4(*f*) show an illustrative diagram of a method for wireless positioning according to an embodiment of the present invention.

As shown in FIG. 4(a), a planar graph of a predetermined space to perform wireless positioning is shown, wherein the predetermined space may be a large scale shopping mall, an office site or the like. According to one embodiment of the present invention, an electronic map of the planar graph of the predetermined space may be created in advance. The manner to create the electronic map does not limit the scope of the present invention, and those killed in the art may create the electronic map based on existing methods in the art.

Figure 4B:
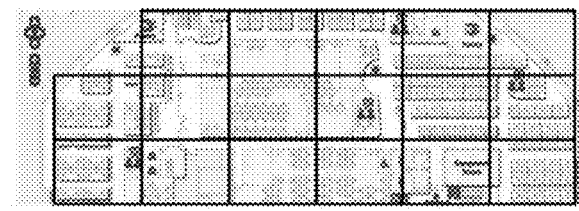

As shown in FIG. 4(b), the entire predetermined space is divided into multiple areas, that is, setting initial boundaries between respective areas. According to one embodiment of the present invention, the size of each area may be 50-200 square meters. However, the above area range of each area may also be other values.

Figure 4C:
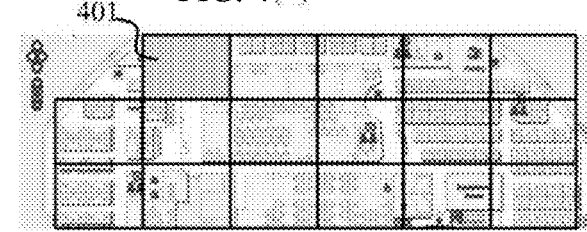

As shown in FIG. 4(c), one area is selected, for example, the area 401 is selected. The number and locations of reference points are determined in the area 401 in a manner of field detection. The determined number and locations of reference points may for example be the number and locations of reference points which have best signal strength distribution.

Figure 4D:
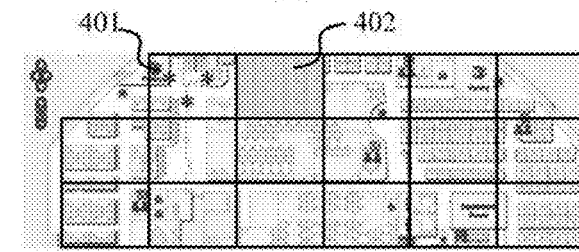

As shown in FIG. 4(d), after the number and locations of reference points are determined in the area 401 (e.g. the number and locations denoted by stars in the area 401), another area is selected, for example, the area 402 is selected. The best number and locations of reference points are determined in the area 402.

Figure 4E:
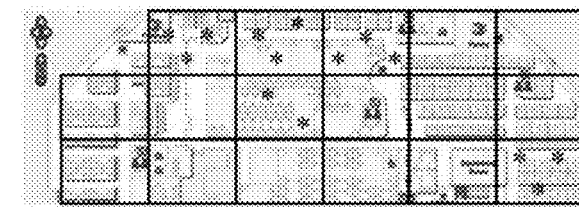

As shown in FIG. 4(e), according to the above manner, the number and locations of references in all areas are determined (e.g. the number and locations denoted by stars in each area).

Figure 4F:
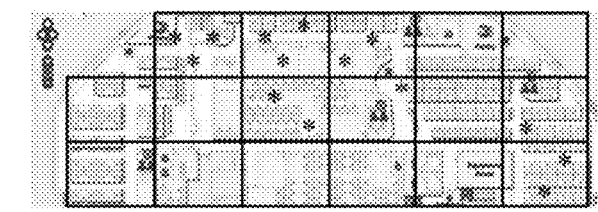

As shown in FIG. 4(f), after the number and locations of reference points in all areas are determined, the number and locations of reference points in each area are finely adjusted, for example, the number and locations denoted by stars in each area. According to one embodiment of the present invention, the number of reference points in some area may be zero.

FIG. 5 is an illustrative diagram showing a method for delimiting each area boundary according to an embodiment of the present invention.

Figure 5A:
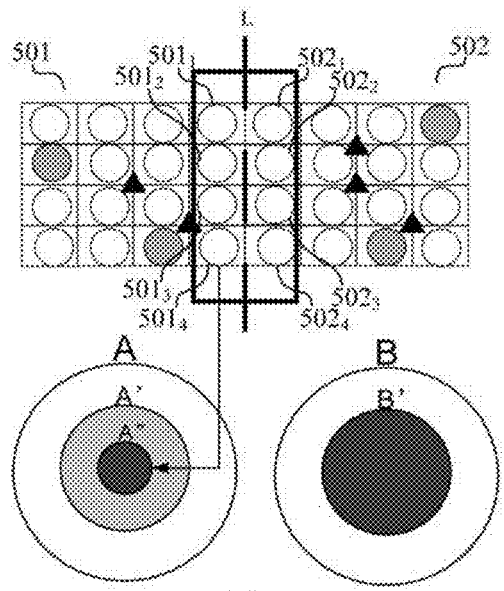
FIGS. 5(a), 5(b), and 5(c) show an illustrative diagram of a method for delimiting each area boundary according to an embodiment of the present invention.

As shown in FIG. 5(a), a first area 501 and a second area 502 are two exemplary areas in the multiple areas as shown in FIG. 4(a). Each area contains for example 16 zones, wherein black circles represent locations of the reference points, and black triangles represent locations of wireless access points arranged in this area. Dashed line L represents the initial boundary separating the first area 501 and the second area 502. Reference symbols $501_1$, $501_2$, $501_3$ and $501_4$ represent zones adjacent to the initial boundary in the first area 501. Reference symbols $502_k$, $502_2$, $502_3$ and $502_4$ represent zones adjacent to the initial boundary in the second area 502. In the following, the zone adjacent to the initial boundary is simply referred to as "boundary zone".

According to one embodiment of the present invention, the signal feature value (for example, which may be a RSSI signal) from a wireless access point is detected in the boundary zone, and a set of identifiers of scannable (detectable) wireless access points in the boundary zone is obtained based on the detected signal feature values, for example, the set of identifiers (identifier set) is an MAC (Media Access Control) address set. According to one embodiment of the present invention, each wireless access point has a globally unique MAC address. The boundary zones in which the signal feature values from the wireless access point (AP) are detected may be all the boundary zones or part of the boundary zones, which does not limit the scope of the present invention.

The lower side of FIG. 5(a) shows two sets with the following meaning. Set A represents the identifier (MAC address) set of wireless access points that may be detected in all the zones in the first area 501, set A' represents the identifier (MAC address) set of wireless access points that may be detected in all the boundary zones $501_1$, $501_2$, $501_3$ and $501_4$ in the first area 501, set A" represents the identifier (MAC address) set of wireless access points that may be detected in one (such as zone $501_1$) of all the boundary zones $501_1$, $501_2$, $501_3$ and $501_4$ in the first area 501, set B represents the identifier (MAC address) set of wireless access points that may be detected in all the zones in the second area 502, and set B' represents the identifier (MAC address) set of wireless access points that may be detected in all the boundary zones $502_1$, $502_2$, $502_3$ and $502_4$ in the second area 502.

The above sets have the following relationship: A" $\subseteq$ A' $\subseteq$ A, B' $\subseteq$ B.

According to one embodiment of the present invention, the apparatus 300 according to an embodiment of the present invention as shown in FIG. 3 may also comprise a determination unit 308. The determination unit 308 may be configured to determine whether A" is a subset of B'. If A" is not a subset of B', the determination unit 308 determines that a first boundary zone $501_1$ finally belongs to the first area 501. If A" is a subset of B', the determination unit 308 continues to determine whether the first boundary zone $501_1$ finally belongs to the first area 501 or the second area 502. According to one embodiment of the present invention, said continuing to determine whether the first boundary zone $501_1$ finally belongs to the first area 501 or the second area 502 may use the method of minimum-distance criterion.

Figure 5B:
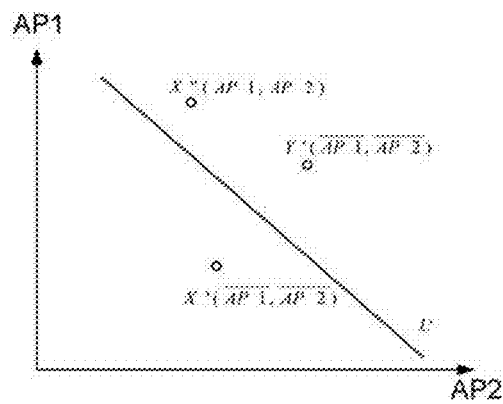

As shown in FIG. 5(b), an illustrative diagram of performing determination with the minimum-distance criterion by the determination unit 308 according to one embodiment of the present invention is shown. In FIG. 5(b), the ordinate represents the detected signal strength of RSSI of the first wireless access point, and the abscissa represents the detected signal strength of RSSI of the second wireless access point. The above is only for the illustrative purpose. According to another embodiment of the present invention, there may be for example more coordinate axes representing detected signal strength of RSSI of more wireless access points to form multi-dimensional vector space. In FIG. 5(b), points X', Y' and X" are shown, wherein point X' is a point with the average $\overline{AP1}$ of the signal feature values (e.g., RSSI signal strength) of the first wireless access point detected in all boundary zones in the first area 501 with respect to time as the abscissa and the average $\overline{AP2}$ of the signal feature values of the second wireless access point with respect to time as the ordinate, point Y' is a point with the average $\overline{AP1}$ of the signal feature values of the first wireless access point detected in all boundary zones in the second area 502 with respect to time as the abscissa and the average $\overline{AP2}$ of the signal feature values of the second wireless access point with respect to time as the ordinate, and point X" is a point with the average AP1 of the signal feature value of the first wireless access point detected in for example the first boundary zone $501_1$ in the first area 501 with respect to time as the abscissa and the average AP2 of the signal feature value of the second wireless access point with respect to time as the ordinate. In other words, point X' in the vector space is formed by the average of the signal feature values of respective wireless access points detected in each zone adjacent to the initial boundary L in the first area 501 with respect to time, point Y' in the vector space is formed by the average of the signal feature values of respective wireless access points detected in each zone adjacent to the initial boundary L in the second area 502 with respect to time, and point X" in the vector space is formed by the average of the signal feature values of respective wireless access points detected in for example the first boundary zone $501_1$ adjacent to the initial boundary L in the first area 501 with respect to time.

According to one embodiment of the present invention, a middle separation line (for example a vertical bisection line) L' is made between point X' and point X", wherein in a three-dimensional space formed by 3 coordinates, the middle separation line L' may also be a middle separation plane, and in multi-dimensional space formed by more than 3 coordinates, it may also be another middle separation body or the like. The determination unit 308 is configured to perform the following determination: determining that the first boundary zone $501_1$ finally belongs to the first area 501 if point X" is located at the point X' side of the separation line L'; and determining that the first boundary zone $501_1$ finally belongs to the second area 502 if point X" is located at the point Y' side of the separation line L'. Separation line could also be line, plane, or hyperplane.

According to one embodiment of the present invention, based on the principle of symmetry, a method similar to the above may be used to perform determination for the first boundary zone $502_1$ in the second area 502.

The detection unit 302 is configured to perform n (n may be a positive integer) times of detection in time sequence within a time period in the first zone 501. For example, the time period may be 10 hours or 6 hours, which does not limit the scope of the present invention. Those skilled in the art may set the time period based on the time required for the offline training.

According to one embodiment of the present invention, the determination unit 308 is also configured to perform majority decision based on the results of the above n times of detection, that is, determine that the first boundary zone $501_1$ finally belongs to the first area 501 if a ratio (e.g. a first ratio) with which the first boundary zone $501_1$ is determined to finally belong to the first area 501 is larger than a first threshold in the n times of detection, and otherwise determine that the first boundary zone $501_1$ finally belongs to the second area 502. The above first threshold may be for example 70%. The value of the first threshold does not limit the scope of the present invention, and those skilled in the art may set it based on practical requirement.

The determination unit 308 is further configured to determine whether other boundary zones $501_2$, $501_3$ and $501_4$ than the first boundary zone $501_1$ in the first area 501 finally belong to the first area 501 or the second area 502, and compare a ratio (i.e. a second ratio) with which the above first boundary zone and the above other boundary zones in the first area 501 are determined to finally belong to the first area 502 with a second threshold. For example, when delimiting the initial boundary, the boundary zones $501_1$,

501₂, 501₃ and 501₄ belong to the first area 501. However, after the above detection process, the boundary zones 501₁, 501₃ and 501₄ are determined to finally belong to the first area 501, and the boundary zone 501₂ is determined to finally belong to the second area 502, such that the ratio with which the boundary zones in the first area 501 are determined to finally belong to the first area 501 is 75%. The above second threshold may be for example 70%. The value of the second threshold does not limit the scope of the present invention, and those skilled in the art may set it based on practical requirement.

Figure 5C:
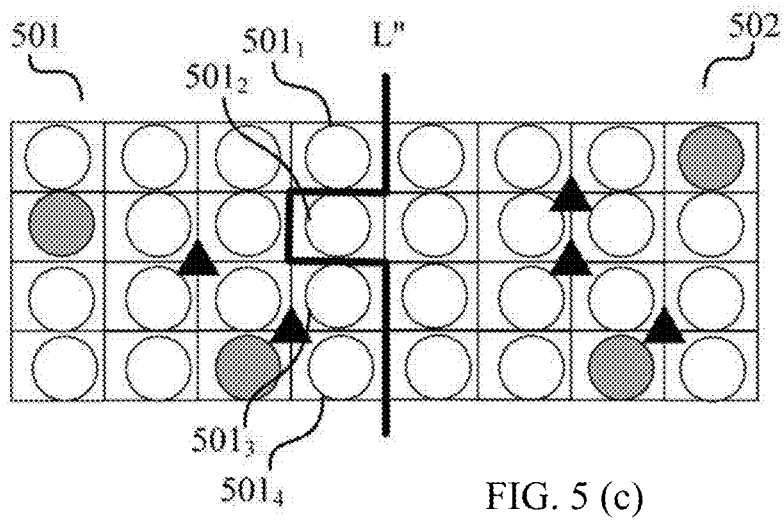

The second delimitation unit 309 is configured to discard the initial boundary if the second ratio is lower than the second threshold. According to another embodiment of the present invention, if the second ratio is larger than (or equal to) the second threshold, the initial boundary is finely adjusted, that is, the boundary zone which is determined to finally belong to the second area 502 but was set into the first area 501 when delimiting the initial boundary is reset into the second area 502. For example, according to the above example, the ratio with which the boundary zones in the first area 501 are determined to finally belong to the first area 501 is 75%, and the above second threshold is 70%; therefore, the second ratio is larger than the second threshold, and then the initial boundary is finely adjusted, that is, the boundary zone 501₂ which is determined to finally belong to the second area 502 but was set into the first area 501 when delimiting the initial boundary is reset into the second area 502. Thereby, the final boundary line L″ is determined as shown in FIG. 5(c).

FIG. 6 is an illustrative diagram showing a method for selecting the number and locations of reference points according to an embodiment of the present invention.

After the boundary is delimited, it is possible to select the number and locations of the reference points by the exhaustive method. Considering the layered method and the area division method according to embodiments of the present invention, it is possible to limit the search space to one area and perform the offline process only once, which may reduce the search complexity and the deployment cost.

As shown in FIG. 6, a area 601 (e.g., the first area) is divided into N zones, for example 16 zones, which are denoted respectively as $Z_j$, where j is larger than or equal to 1 but smaller than or equal to N.

According to one embodiment of the present invention, a terminal is started in each zone of the first area 601, that is, N terminals (e.g. 16 here) are started here to perform the selection of reference points. Here, the terminal is a hardware platform the same as the reference point to collect RSSI signals from the wireless access points.

According to one embodiment of the present invention, a terminal in each zone of the first area detects signal feature values of each wireless access point at different time points within a period of time, and the obtained signal feature values of each wireless access point at different time points are used to constitute a signal feature matrix. For example, within a period of time (for example 12 hours), the terminal located in each zone detects and calculates the signal feature value (RSSI) of each wireless access point at different time points, wherein the signal feature values of respective wireless access points detected by a terminal at some time point within the period of time is taken as a signal feature vector. Each signal feature vector may be denoted as $R^A_{Z,T}$, where Z is the identifier of the zone, T represents the detection time point, and A is the identifier of the wireless access point.

More specifically, for example, the signal feature value of a wireless access point AP1 detected by the terminal M1 located in a first zone Z1 at time T1 is $R^1_{Z1,T1}$, the detected signal feature value of a wireless access point AP2 is $R^2_{Z1,T1}$, and thereby the signal feature vector of the first zone Z1 at the time T1 may be obtained as $[R^1_{Z1,T1}, R^2_{Z1,T1}]$; the signal feature value of a wireless access point AP1 detected by the terminal M1 located in a first zone Z1 at time T2 is $R^1_{Z1,T2}$, the detected signal feature value of a wireless access point AP2 is $R^2_{Z1,T2}$, and thereby the signal feature vector of the first zone Z1 at the time T2 may be obtained as $[R^1_{Z1,T2}, R^2_{Z1,T2}]$; the signal feature value of a wireless access point AP1 detected by the terminal M1 located in a first zone Z1 at time Tn is $R^1_{Z1,Tn}$, the detected signal feature value of a wireless access point AP2 is $R^2_{Z1,Tn}$, and thereby the signal feature vector of the first zone Z1 at the time Tn may be obtained as $[R^1_{Z1,Tn}, R^2_{Z1,Tn}]$.

As such, multiple signal feature vectors may be obtained through detecting by the terminal M1 located in the first zone Z1 at different time points within the entire period of time, for example, 10000 signal feature vectors may be obtained. Similarly, multiple signal feature vectors may also be obtained through detecting by the terminal Mn located in another zone Zn at different time points within the entire period of time, for example, 10000 signal feature vectors may be similarly obtained. As such, if multiple corresponding signal feature vectors obtained through detecting by the terminals located in all zones at the same time point are taken as a group of signal feature vectors, then multiple groups of signal feature vectors may be obtained, for example 10000 groups of signal feature vectors may be obtained. Those multiple groups of signal feature vectors constitute a signal feature matrix.

According to one embodiment of the present invention, with the exclusive method, the terminals with different number and location combinations in each zone are selected as initial reference points, and a first part of signal feature vectors of the initial reference points in the signal feature matrix and corresponding signal feature vectors of zones other than the initial reference points in the signal feature matrix are used to build a mathematical model. For example, in the first area 601, the terminal M1, M2 and M3 in the zones Z1, Z2 and Z3 are taken as the initial reference points, and then the first part of signal feature vectors detected by the terminal M1, M2 and M3 respectively in the zones Z1, Z2 and Z3 in the signal feature matrix and corresponding signal feature vectors detected in zones (such as the remaining 13 zones in the first area 601) other than the initial reference points in the above signal feature matrix are used to build the mathematical model. The corresponding signal feature vectors are the signal feature vectors detected in the same time period as the first part of signal feature vectors but in different zones from the first part of signal feature vectors.

The mathematical model reflects distribution of the signal strength of respective wireless access points at each initial reference point (e.g. M1, M2, M3) in the first area 601 with respect to the signal strength of the zones other than the initial reference points (e.g. the remaining 13 zones in the first area 601). As an example, it is possible to build the mathematical model by select 7000 groups of the first part of feature vectors and corresponding signal feature vectors from the 10000 groups of signal feature vectors constituting the above signal feature matrix. The method for building the mathematical model does not limit the scope of the present invention, and those skilled in the art may build the mathematical model based on the existing methods in the prior art.

According to one embodiment of the present invention, the mathematical model is verified by using a second part of signal feature vectors other than the signal feature vectors for building the mathematical model, of the selected reference points with different number and location combinations, in the signal feature matrix to obtain an error probability of the mathematical model, wherein the second part of signal feature vectors are the signal feature vectors obtained in a different time period from the first part of signal feature vectors.

More specifically, the number of reference points is firstly selected, for example, i terminals are selected as the reference points, where $2 \leq i \leq N-1$. Here, for example, i=2 is firstly set, that is, 2 terminals are selected as the reference points.

Then, the locations of the reference points are selected, that is, a first location combination of the i terminals is selected. For example, the terminal M1 located in the first zone Z1 and the terminal M2 located in the second zone Z2 are respectively taken as the first reference point RP1 and the second reference point RP2.

According to one embodiment of the present invention, the remaining multiple groups of signal feature vectors (the second part of signal feature vectors) other than those for building the mathematical module among all the signal feature vectors detected by the two terminals M1 and M2, for example the 3000 groups of signal feature vectors other than the 7000 groups, are used to verify the mathematical model to obtain the error probability of the mathematical model.

According to another embodiment of the present invention, the signal feature vectors for verifying the mathematical model may overlap the signal feature vectors for building the mathematical model, or may not overlap them at all; they may be all the signal feature vectors other than those for building the mathematical model, or may be part of the signal feature vectors other than those for building the mathematical model. The selection method of the signal feature vectors for verifying the mathematical model does not limit the scope of the present invention.

The error probability of the mathematical model represents the degree of the signal feature vectors in the zones other than the initial reference points evaluated by taking the number and location combination (for example M1 and M2) as the initial reference points RP1 and RP2 matching with the actual signal feature vectors in the zones other than the initial reference points. The higher the error probability, the worse the degree of the mathematical model built by taking the number and location combination as the initial reference points RP1 and RP2 matching with the actual situation. The lower the error probability, the better the degree of the mathematical model built by taking the number and location combination as the initial reference points RP1 and RP2 matching with the actual situation, and the number and location distribution of the final reference points to be selected is more approached.

Next, a second location combination of i terminals is selected. For example, the terminal M1 located in the first zone Z1 and the terminal M3 located in the third zone Z3 are respectively taken as the initial reference points RP1 and RP3. The error probability of the second location combination may be obtained by performing the same calculation process as the above.

Figures 6A, 6B:
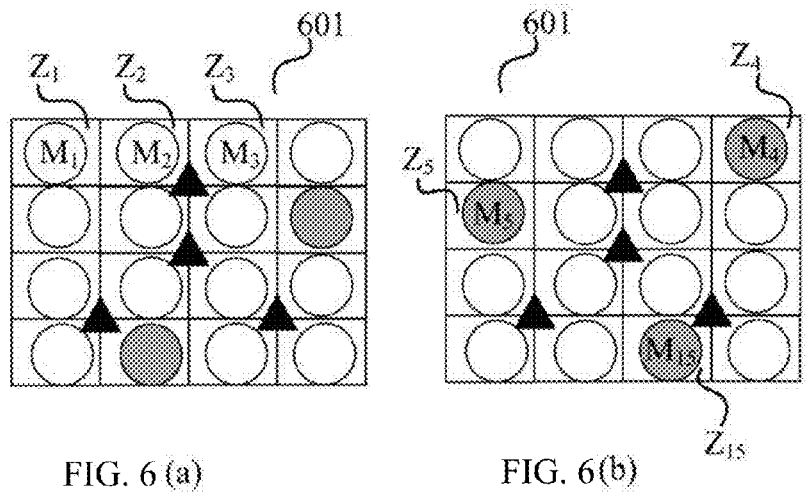
FIGS. 6(a) and 6(b) show an illustrative diagram of a method for selecting the number and locations of reference points according to an embodiment of the present invention.

It is determined whether all the location combinations of i terminals have been calculated. If not, it is continued to select a location combination to perform the verification calculation. If all the location combinations of i terminals have been calculated, it is determined whether i is smaller than M−1. If i is smaller than M−1, let i=i+1, and then repeat the above operations. In other words, after 2 initial reference points are selected and the calculation of the error probability of each location combination of all the location combinations is finished, 3 initial reference points are selected to finish the calculation of the error probability of each location combination of all the location combinations with the same method as the above, then 4 initial reference points are selected, then 5 initial reference points are selected, and so on until N−1 initial reference points are selected. In the case of selecting 3 initial reference points, as shown in FIG. 6(b), the terminal M4 located in the fourth zone Z4, the terminal M5 located in the fifth zone Z5 and the terminal M15 located in the fifteenth zone Z15 are taken as the first initial reference point RP1, the second initial reference point RP2 and the third initial reference point RP3 respectively. In the present embodiment, at most 15 reference points may be selected for detection and calculation.

According to one embodiment of the present invention, based on the experience, for example in the case of 50-200 square meters for each area, it is sufficient that 2-3 initial reference points are selected, and no more reference points need to be selected.

According to one embodiment of the present invention, the initial reference points of the number and location combination with the lowest error probability are determined as the final reference points.

In the above, with reference to the figures, the operations of the apparatus 300 for performing the wireless positioning operation according to an embodiment of the present invention to perform the area boundary delimitation and select the number and locations of the reference points in each area when constructing the wireless positioning system are described.

Figure 7:
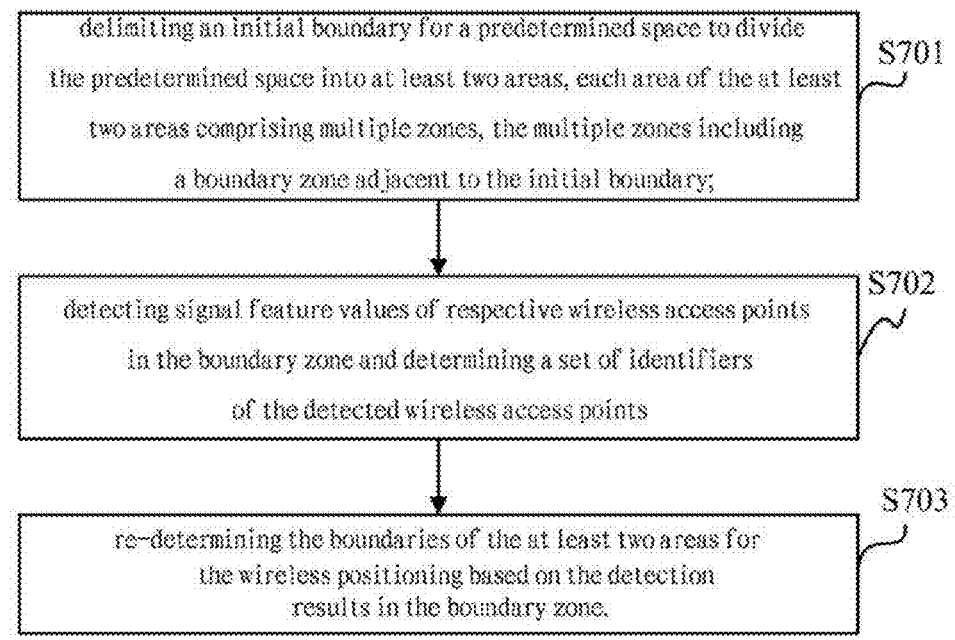
FIG. 7 shows a flowchart of a method for wireless positioning according to an embodiment of the present invention.

FIG. 7 is a flowchart showing a method for wireless positioning according to an embodiment of the present invention.

As shown in FIG. 7, in operation S701, an initial boundary for a predetermined space is delimited to divide the predetermined space into at least two areas, each area of the at least two areas comprising multiple zones, the multiple zones including a boundary zone adjacent to the initial boundary. In operation S702, signal feature values of respective wireless access points are detected in the boundary zone and an identifier (MAC address) set of each detected wireless access point is determined. In operation S703, the boundaries of the at least two areas are re-determined for the wireless positioning based on the detection results in the boundary zones.

In the method of one embodiment of the present invention, the identifier set of wireless access points detected in the first boundary zone in the first area of the at least two areas is represented by A", and the identifier set of wireless access points detected in all boundary zones in the second area of the at least two areas is represented by B'. The method further comprises: determining whether A" is a subset of B', and if A" is not a subset of B', determining that a first boundary zone in a first area of the at least two areas finally belongs to the first area, but if A" is a subset of B', continuing to determine whether the first boundary zone finally belongs to the first area or the second area.

The method of one embodiment of the present invention further comprises: performing n times of detection in time sequence in the first boundary zone, and determining that the first boundary zone finally belongs to the first area if a first ratio with which the first boundary zone is determined to finally belong to the first area is larger than a first threshold in the n times of detection, and otherwise determining that the first boundary zone finally belongs to the second area, where n is a positive integer.

The method of one embodiment of the present invention further comprises: determining whether other boundary zones than the first boundary zone in the first area finally belong to the first area or the second area, and comparing a second ratio with which the first boundary zone and the other boundary zones in the first area are determined to finally belong to the first area with a second threshold, and discarding the initial boundary if the second ratio is lower than the second threshold. According to another embodiment of the present invention, if the second ratio is larger than or equal to the second threshold, the initial boundary is finely adjusted, that is, the boundary zone which is determined to finally belong to the second area but was set into the first area when delimiting the initial boundary is reset into the second area.

In the method of one embodiment of the present invention, it is continued to determine whether the first boundary zone finally belongs to the first area or the second area in the following manner of: forming a point X' in vector space from an average value of the signal feature values of respective wireless access points detected in each boundary zone in the first area with respect to time; forming a point X" in vector space from the signal feature values of respective wireless access points detected in the first boundary zone in the first area with respect to time; forming a point Y' in vector space from an average value of the signal feature values of respective wireless access points detected in each boundary zone in the second area with respect to time; setting a middle separation line between the point X' and the point Y'; determining that the first boundary zone finally belongs to the first area if X" is located at the point X' side of the separation line; and determining that the first boundary zone finally belongs to the second area if X" is located at the point Y' side of the separation line.

The method of one embodiment of the present invention further comprises: using the signal feature values of respective wireless access points detected by a terminal in each zone of the first area at different time points to constitute a signal feature matrix; selecting the terminals with different number and location combinations as initial reference points; using a first part of signal feature vectors of the initial reference points of the first area in the signal feature matrix and corresponding signal feature vectors of zones other than the initial reference points in the signal feature matrix to build a mathematical model which reflects distribution relationship of the signal strength of respective wireless access points at the initial reference points in the first area and the signal strength of the zones other than the initial reference points, wherein the corresponding signal feature vectors are the signal feature vectors obtained in the same time period as the first part of signal feature vectors; verifying the mathematical model by using a second part of signal feature vectors other than the signal feature vectors for building the mathematical model, of the selected initial reference points with different number and location combinations in the signal feature vectors to obtain an error probability of the mathematical model, wherein the second part of signal feature vectors are the signal feature vectors obtained in a different time period from the first part of signal feature vectors; and determining the initial reference points of a number and location combination with the lowest error probability as the final reference points.

In the method of one embodiment of the present invention, the signal feature value of a first wireless access point detected by the terminal located in a first zone Z1 at time Tn is denoted as $R^1_{Z1,Tn}$, the signal feature value of a second wireless access point detected by the terminal located in the first zone Z1 at time Tn is denoted as $R^2_{Z1,Tn}$, and thereby the obtained signal feature vector is $[R^1_{Z1,Tn}, R^2_{Z1,Tn}]$; multiple signal feature vectors obtained through detecting by the terminals located in respective zones at the same time point constitute a group of signal feature vectors, and then multiple groups of signal feature vectors obtained through detecting by the terminals located in respective zones during a period of time constitute the signal feature matrix.

In the method of one embodiment of the present invention, the error probability represents the degree of the signal feature vectors in the zones other than the initial reference points evaluated by taking the number and location combination as the initial reference points matching with the actual signal feature vectors in the zones other than the initial reference points, and the lower the error probability, the better the degree of the mathematical model built by taking the number and location combination as the initial reference points matching with the actual situation.

Figure 8:
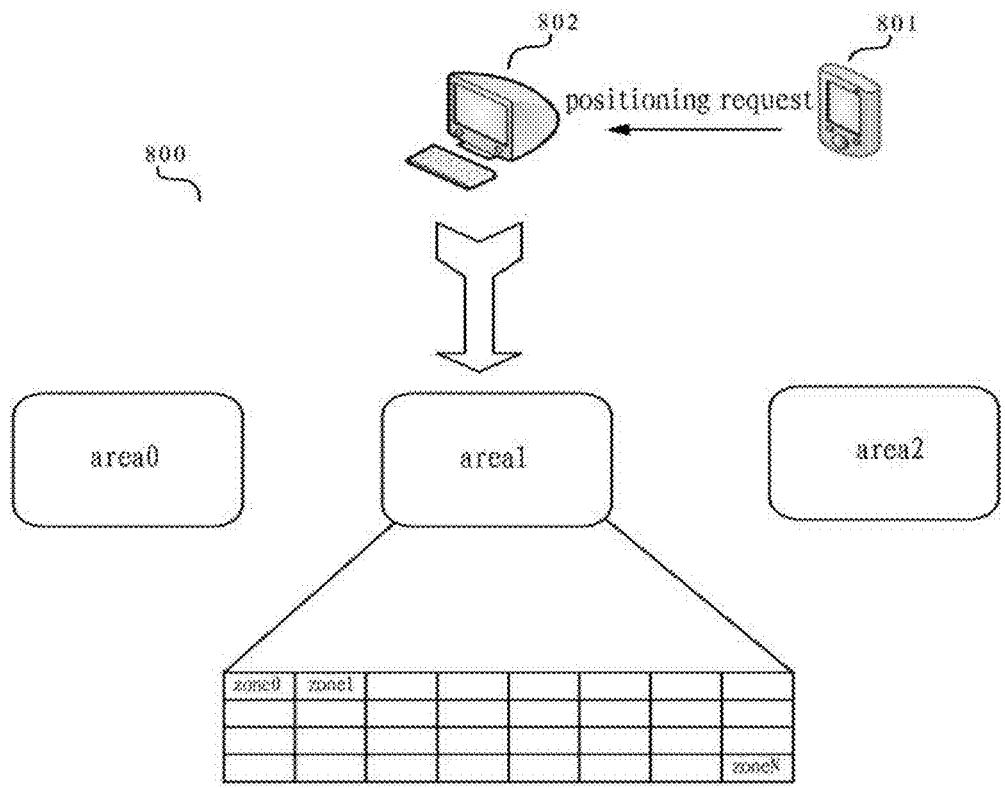
FIG. 8 shows a schematic diagram of a system for performing the positioning operations by using the wireless positioning method according to an embodiment of the present invention.

FIG. 8 is an illustrative diagram showing a system for positioning operations by using the wireless positioning method according to an embodiment of the present invention.

As shown in FIG. 8, the positioning system 800 according to an embodiment of the present invention basically comprises a mobile terminal 801 (for example, the mobile terminal 207) and a positioning server 802 (for example, the positioning server 205). According to one embodiment of the present invention, when the mobile terminal 801 is located within the positional range, for example in the site as shown in FIG. 4, the mobile terminal 801 may firstly send a positioning request to the positioning server 802, which may be realized for example by a user starting a positioning application in the mobile terminal 801, and the positioning application transmitting the positioning request through the network. When the positioning server 802 receives the positioning request from the mobile terminal 801, the positioning server 802 firstly calculates the location information of a certain area (for example the location information of area 1) determined according to the above embodiments of the present invention and in which the mobile terminal 801 is located, based on the area division algorithm described in the above, then calculates the location information of a certain zone (for example the location of zone N) in which the mobile terminal 801 is located, in the area range. The positioning server 802 transmits the calculated position information of the mobile terminal 801 to the mobile terminal 801. The mobile terminal 801 receives the location information sent from the positioning server 802. The mobile terminal 801 may display its location within the site range on the display screen of the mobile terminal 801 based on the location information, or speak its location within the site range by voice through the speaker of the mobile terminal 801.

Figure 9:
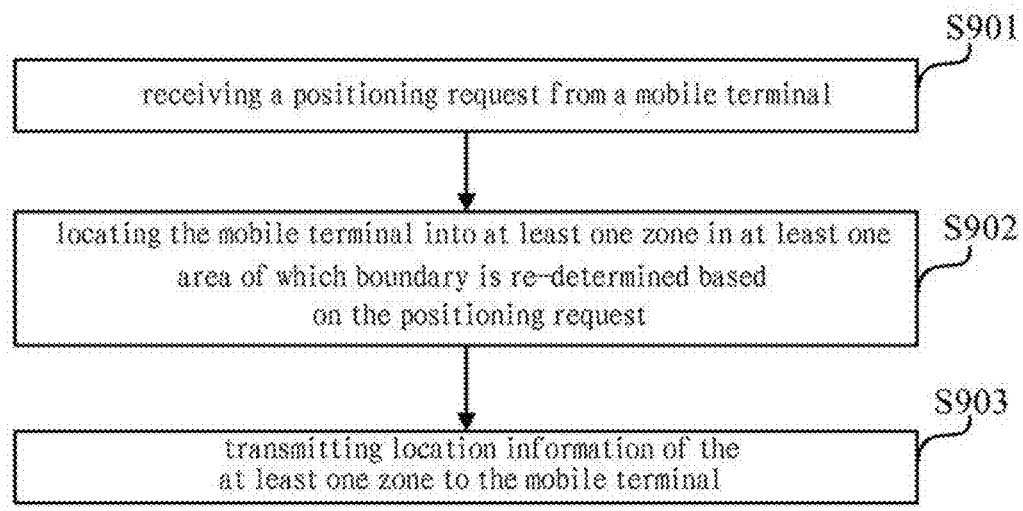
FIG. 9 shows a flowchart of a method of performing the positioning operations by using the wireless positioning system according to an embodiment of the present invention.

FIG. 9 is a flowchart showing a method for positioning operations by a wireless positioning system according to an embodiment of the present invention.

As shown in FIG. 9, in operation S901, a positioning request is received from a mobile terminal. In operation S902, the mobile terminal is located into at least one zone in at least one area whose boundary is re-determined as described in the above, based on the positioning request. In operation S903, location information of the at least one zone is sent to the mobile terminal.

According to another embodiment of the present invention, there may also be provided a wireless positioning apparatus. The wireless positioning apparatus comprises a receiving unit configured to receive a positioning request from a mobile terminal; a positioning unit configured to locate the mobile terminal into at least one zone in at least one area whose boundary is re-determined as described in the above based on the positioning request; and a transmitting unit configured to transmit location information of the at least one zone to the mobile terminal. According to one embodiment of the present invention, the above provided wireless positioning apparatus may be configured in the positioning server 802 as shown in FIG. 8.

The operations of the above wireless positioning method and wireless positioning apparatus may also be implemented according to the prior art. For example, the signal strength of each access point is scanned (detected) by the reference points whose number and location combination is determined in each zone to form a multi-dimensional information matrix containing location information. This multi-dimensional information matrix may be stored in the positioning server or be sent to the mobile terminal and stored in the mobile terminal itself. When the mobile terminal performs positioning, it scans (detects) the signal strength of those access points by itself to form a low dimensional matrix containing location information. This low dimensional information matrix may be sent to the positioning server or be stored in the mobile terminal itself. When performing the positioning operation through the positioning server, the mobile terminal sends the low dimensional information matrix together with the positioning request to the positioning server which compares the two information matrices to determine the location information of the zone where the mobile terminal is located. When the mobile terminal performs the positioning operation itself, the mobile terminal may compare the low dimensional information matrix directly with the multi-dimensional inform matrix obtained through respective reference points to obtain the location information of the zone where itself is located. Therefore, the wireless positioning method according to the present invention may be performed in the positioning server or in the mobile terminal itself.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for wireless positioning, comprising:
   delimiting an initial boundary for a predetermined space to divide the predetermined space into at least two areas, each area of the at least two areas comprising multiple zones, the multiple zones including a boundary zone adjacent to the initial boundary;
   detecting signal feature values of respective wireless access points in the boundary zone and determining an identifier set of detected wireless access points; and
   re-determining the boundaries of the at least two areas for the wireless positioning based on the detection results in the boundary zone.

2. The method according to claim 1, further comprising:
   determining whether or not A" is a subset of B', and if A" is not a subset of B', determining that a first boundary zone in a first area of the at least two areas finally belongs to the first area, but if A" is a subset of B', continuing to determine whether the first boundary zone finally belongs to the first area or a second area;
   wherein A" represents the identifier set of wireless access points detected in the first boundary zone, and B' represents the identifier set of wireless access points detected in all boundary zones in the second area of the at least two areas.

3. The method according to claim 2, further comprising performing n times of detection in time sequence in the first boundary zone, and determining that the first boundary zone finally belongs to the first area if a first ratio with which the first boundary zone is determined to finally belong to the first area is larger than a first threshold in the n times of detection, and otherwise determining that the first boundary zone finally belongs to the second area, where n is a positive integer.

4. The method according to claim 2, further comprising:
   determining whether other boundary zones than the first boundary zone in the first area finally belong to the first area or the second area, and comparing a second ratio with which the first boundary zone and the other boundary zones in the first area are determined to finally belong to the first area with a second threshold; and
   discarding the initial boundary if the second ratio is lower than the second threshold.

5. The method according to claim 4, further comprising:
   using the signal feature values of respective wireless access points detected by terminals in respective zones of the first area at different time points to constitute a signal feature matrix;
   selecting the terminals with different number and location combinations as initial reference points;
   using a first part of signal feature vectors of the initial reference points of the first area in the signal feature matrix and corresponding signal feature vectors of zones other than the initial reference points in the signal feature matrix to build a mathematical model which reflects distribution of the signal strength of respective wireless access points at the initial reference points in the first area and the signal strength of the zones other than the initial reference points, wherein the corresponding signal feature vectors are the signal feature vectors obtained in the same time period as the first part of signal feature vectors;
   verifying the mathematical model by using a second part of signal feature vectors other than the signal feature vectors for building the mathematical model, of the selected reference points with different number and location combinations, in the signal feature matrix to obtain an error probability of the mathematical model, wherein the second part of signal feature vectors are the signal feature vectors obtained in a different time period from the first part of signal feature vectors; and
   determining the initial reference points of a number and location combination with the lowest error probability as the final reference points.

6. The method according to claim 5, wherein the signal feature value of a first wireless access point detected by the terminal located in a first zone Z1 at time Tn is denoted as $R^1_{Z1,Tn}$, the signal feature value of a second wireless access point detected by the terminal located in the first zone Z1 at time Tn is denoted as $R^2_{Z1,Tn}$, and thereby the obtained signal feature vector is $[R^1_{Z1,Tn}, R^2_{Z1,Tn}]$;
   multiple signal feature vectors obtained through detecting by the terminals located in respective zones at the same time point constitute a group of signal feature vectors, and then multiple groups of signal feature vectors obtained through detecting by the terminals located in respective zones during a period of time constitute the signal feature matrix.

7. The method according to claim 5, wherein the error probability represents the degree of the signal feature vectors in the zones other than the initial reference points evaluated by taking the number and location combination as the initial reference points matching with the actual signal feature vectors in the zones other than the initial reference points, and the lower the error probability, the better the degree of the mathematical model built by taking the number and location combination as the initial reference points matching with the actual situation.

8. The method according to claim 2, wherein it is continued to determine whether the first boundary zone finally belongs to the first area or the second area by:
  forming a point X' in vector space from an average value of the signal feature values of respective wireless access points detected in each boundary zone in the first area with respect to time;
  forming a point X" in vector space from an average value of the signal feature values of respective wireless access points detected in the first boundary zone in the first area with respect to time;
  forming a point Y' in vector space from an average value of the signal feature values of respective wireless access points detected in each boundary zone in the second area with respect to time;
  setting a middle separation line between the point X' and the point Y';
  determining that the first boundary zone finally belongs to the first area if X" is located at the point X' side of the separation line; and
  determining that the first boundary zone finally belongs to the second area if X" is located at the point Y' side of the separation line.

9. A wireless positioning method, comprising:
  receiving a positioning request from a mobile terminal;
  locating the mobile terminal into at least one zone in at least one area of which boundary is re-determined according to claim 1 based on the positioning request; and
  transmitting location information of the at least one zone to the mobile terminal.

* * * * *